(12) United States Patent
Skov Hansen et al.

(10) Patent No.: US 11,343,889 B2
(45) Date of Patent: May 24, 2022

(54) CIRCADIAN LAMP AND METHOD FOR OPERATING SUCH LAMP

(71) Applicant: CHROMAVISO A/S, Aarhus N (DK)

(72) Inventors: Torben Skov Hansen, Aalborg (DK); Anders Kryger Nielsen, Viby J. (DK)

(73) Assignee: CHROMAVISO A/S, Aarhus N (DK)

(*) Notice: Subject to any disclaimer, the term of this patent is extended or adjusted under 35 U.S.C. 154(b) by 0 days.

(21) Appl. No.: 16/608,387

(22) PCT Filed: Apr. 26, 2018

(86) PCT No.: PCT/DK2018/050082
§ 371 (c)(1),
(2) Date: Oct. 25, 2019

(87) PCT Pub. No.: WO2018/196938
PCT Pub. Date: Nov. 1, 2018

(65) Prior Publication Data
US 2020/0205261 A1    Jun. 25, 2020

(30) Foreign Application Priority Data
Apr. 27, 2017   (DK) .................... PA 2017 70286

(51) Int. Cl.
*H05B 45/20* (2020.01)
*F21S 10/02* (2006.01)
*F21V 3/02* (2006.01)
*H05B 47/16* (2020.01)

(52) U.S. Cl.
CPC ............. *H05B 45/20* (2020.01); *F21S 10/02* (2013.01); *F21V 3/02* (2013.01); *H05B 47/16* (2020.01)

(58) Field of Classification Search
CPC ......... H05B 45/20; H05B 47/16; F21S 10/02; F21V 3/02; Y02B 20/42
See application file for complete search history.

(56) References Cited

U.S. PATENT DOCUMENTS

| 8,427,311 B2 | 4/2013 | Schlangen et al. |
| 9,374,876 B2 | 6/2016 | Alpert |
| 2004/0239243 A1* | 12/2004 | Roberts ............ B60L 50/20 313/512 |
| 2010/0244735 A1 | 9/2010 | Buelow, II |
| 2010/0244740 A1 | 9/2010 | Alpert et al. |
| 2011/0176305 A1 | 7/2011 | Schallmoser |

(Continued)

FOREIGN PATENT DOCUMENTS

| DE | 202011104251 U1 | 11/2011 |
| JP | 2006252944 A | 9/2006 |

(Continued)

OTHER PUBLICATIONS

International Search Report dated Jul. 17, 2018 for PCT/DK2018/050082.
Written Opinion dated Jul. 17, 2018 for PCT/DK2018/050082.

*Primary Examiner* — Henry Luong
(74) *Attorney, Agent, or Firm* — Schmeiser, Olsen & Watts, LLP

(57) ABSTRACT

A lighting system with a lamp including a lighting area with a disc-shaped part emitting cold-white light and ring-shaped part emitting warm white light is provided. The lighting system is programmed to automatically and periodically change between light from these two parts.

15 Claims, 8 Drawing Sheets

(56) References Cited

U.S. PATENT DOCUMENTS

| | | |
|---|---|---|
| 2012/0037933 A1 | 2/2012 | Roth |
| 2015/0062892 A1* | 3/2015 | Krames .................. F21K 9/232 |
| | | 362/231 |
| 2016/0023017 A1 | 1/2016 | Moore-Ede et al. |
| 2016/0219671 A1 | 7/2016 | Maxik et al. |
| 2016/0258603 A1* | 9/2016 | Yokotani ................. F21V 19/02 |
| 2016/0262222 A1 | 9/2016 | Frohnapfel |
| 2016/0273717 A1 | 9/2016 | Krames et al. |
| 2016/0286616 A1 | 9/2016 | van de Ven |
| 2019/0320515 A1* | 10/2019 | Sadwick ................ H05B 45/24 |
| 2019/0364637 A1* | 11/2019 | Medricky .............. H05B 45/46 |

FOREIGN PATENT DOCUMENTS

| | | |
|---|---|---|
| JP | 2015041612 A | 3/2015 |
| JP | 2015138754 A | 7/2015 |
| WO | 2006097794 A1 | 9/2006 |
| WO | WO2006/097794 A1 | 9/2006 |
| WO | 2017053408 A1 | 3/2017 |
| WO | WO2017053408 A1 | 3/2017 |

\* cited by examiner

CIRCADIAN LAMP AND METHOD FOR OPERATING SUCH LAMP

CROSS-REFERENCE TO RELATED APPLICATIONS

This application claims priority to PCT Application No. PCT/DK2018/050082, having a filing date of Apr. 26, 2018, which is based on DK Application No. PA 2017 70286, having a filing date of Apr. 27, 2017, the entire contents both of which are hereby incorporated by reference.

FIELD OF TECHNOLOGY

The following relates to lighting systems and to a method for operating such system for protecting circadian neuroendocrine functions in humans. It also relates to use of such lighting system and method.

BACKGROUND

Adaptation of lighting systems to the natural circadian rhythm of humans has been increasingly in focus in the recent years because reduction of melatonin production due to white lighting at night has adverse health effects. A range of endocrine body functions e.g. suppression of melatonin production has been found when the eyes are exposed to light, especially with wavelengths in the range of 380-520 nm with peak sensitivity around 460 nm.

As discussed in US patent application number US2016/0219671 by Maxik et al and assigned to Biological Illumination LLC, the historical shift of light from fluorescent light sources to LED light has increased the content of blue light in the largely white light spectrum with an increased effect on endocrine body functions such as suppression of melatonin. A thorough discussion on influence of artificial light on nightshift workers is found in US patent application No. US2016/023017. In order to reduce adverse health effects due to light at night, lighting systems are disclosed in these references for which the blue component has been reduced or removed. In US2016/0219671, substitution is made by a including mint-coloured LED light, and in US2016/023017, violet light at around 415 nm is added, as s substitution of the blue light component. Spectra with relatively low amount of blue light for the circadian rhythm are also discussed in US2010/0244740, US2016/0286616, and US2016/0273717.

Commercially, a large variety of lighting systems are available in which the colour temperature and intensity of the light can be changed during the day and night such that the light in daytime has a high content of blue and the light in the evening and night has a smaller amount of blue light or no blue light with an amber, reddish or yellow appearance of the light. Some of those systems offer an otherwise broad spectrum of wavelengths. U.S. Pat. No. 9,374,876 by Alpert discloses an electric lamp with a first and second light source that emit light on either side of 530 nm of the spectrum and which can be selectively energized. US2011/0176305 by Schallmoser, assigned to Osram GmbH, discloses a lamp in which a wavelength converting reflector is used to change the light spectrum, and where a variable aperture adjusts the proportion of light hitting the reflector. In WO2006/097794 two ring sources are used with different optical filters in order to adjust the spectrum. Phosphor coatings for adjustment of the emitted light spectrum are disclosed in US2012/0037933.

Not only the shift in colour temperature has attention but also shift in the appearance of the light source and the direction of light. US2016/0262222 by Frohnapfel assigned to Zumtobel Lighting GmbH discloses a lamp with an aperture in order to change the size of the light source and which contains two light sources with different spectral distributions but largely identical colour locus.

WO2017/053408 by Dell'Ario discloses a standing lamp that can shift between upwards and downwards emission. The principle of reflection of the light on a ceiling or wall for the warm part of the light in circadian illumination has been disclosed in JP2015041612. The shift in illumination direction has a signalling effect to the user between day and night illuminations. However, indirect light results in a reflected light intensity crucially dependent on the colour and reflecting properties of the wall or ceiling and changes the spectrum in dependence on the colour of the reflecting wall or ceiling, which is not useful for circadian illumination. Especially, if the wall is dark blue or black, large parts of the illumination may not be reflected. Therefore, indirect light is not a proper solution for circadian illumination, where control of the light spectrum and intensity is desired.

German utility model DE202011104251U1 by Schröter discloses a lamp configured largely as a light bulb in which a ring of cold-white light diodes surround a central area with warm-white light diodes or where multiple rings or half-rings of warm-white and cold-white light diodes are provided for shining in different directions.

A lamp with an outer narrow ring having lower colour temperature as an inner narrow ring is disclosed in JP2006252944. In JP2015138754, an outer ring has a higher colour temperature as compared to an inner ring.

In these cases, for a given total irradiated flux, the intensity per area of the ring has to be high, as the light emitting area is small, which results in an unpleasant glare effect due to the high intensity from the narrow light source. This is similar to the intensity from a light bulb, resembling a point source of light, which is not pleasant to look at for the user. In order to smoothen the unpleasant high light intensity of a point source or narrow ring, the known art uses diffractive screens. However, this does not completely smoothen the light source, which is still experienced as an unpleasant high shining object. Adding reflectors, on the other hand, increases the production costs.

US20100244735 assigned to Energy Focus Inc. discloses a light socket adapter with a single or four light emitting diodes (LEDs) capable of emitting light with wavelengths above 530 nm. The light socket adapter is configured to be inserted into a standard light socket and further has another socket for insertion of a light bulb emitting light with wavelengths below 530 nm. The light socket adapter has an ambient light sensor which is used by a microprocessor to selectively switch on the LEDs or the light bulb when power is switched on.

Although, the importance of the circadian rhythm has been recognised, the solution for optimizing the light source with respect to comfort is typically complicated and production wise expensive. It would be desirable to provide a simple technical solution for a lamp with circadian light shift which not only has a signalling function, but which also implies a high degree of comfort for the user.

Whereas, great attention has been given to nightshift workers with respect to circadian lighting for some years, a discussion of the influence on rehabilitation of patients in hospitals is relatively new. Recent studies have revealed that circadian lighting improves the patients' sleeping pattern as well as their circadian entrainment in general, with a range of positive effects to their rehabilitation.

Accordingly, there is an on-going effort to create improvements in relation to the circadian rhythm.

SUMMARY

An aspect relates to a lamp without the above-mentioned disadvantages. In particular, it is an objective to provide an improved circadian lighting system with simple, intuitively recognizable day-rhythm information in excess of a changing white light spectrum, beneficial for the circadian rhythm, which in addition has a high degree of comfort for the user, without unpleasant glare effect. It is also an objective to provide a production-wise simple solution with relatively few components and requiring low cost. These objectives are achieved with a lighting system as disclosed in the following as well as a method for operating the lighting system, in particular operating the lighting system with a geometrical time signalling effect of a lamp such that it signals different day-time periods.

The lighting system comprises a lamp, where the term "a lamp" should be understood as "at least one lamp", unless specifically and explicitly restricted to a single lamp. Typically, the lamp has a housing inside which lighting elements are provided, optionally light emitting diodes, LED.

Herein, the term "white light" is used for broad spectrum light without a specific colour. For simplicity, the term is used even in the case where the light has a reduced content of blue light and has a warm-white or rather yellowish appearance. Due to the broadband light spectrum, the term is justified.

The lamp comprises a lighting area with a first and a second light source in the lighting area. The first light source emits a first type of white light with a high content of blue light into the surroundings, and the second light source emits a second type of white light with a low content of blue light into the surroundings.

The lighting system is configured for periodically shifting, for example gradually, optionally automatically, between emission of the first type of white light by the first light source from a disc-shaped part of the lighting area and emission of the second type of white light by the second light source from a ring-shaped part of the lighting area for signalling day-time by the disc-shaped part and night-time by the ring-shaped part to a person. Both the disc-shaped part and ring-shaped are arranged such as to be visible and visually distinguishable by the person when looking at lighting area. The gradual shift is in steps or continuously.

An advantage for the disc shaped light source is that the area is optimised for high intensity, which is needed to resemble daylight while at the same time the intensity per area of the light source is low.

Similarly, for the ring-shaped part which takes up a relatively large area of the disc, the intensity of the light per area is relatively low as compared to a point source, which is pleasant for night illumination. In addition, the low intensity per area preserves the scotopic adaption of the eye in contrast to a point source, which would cause the eye to shift towards photopic vision due to the higher light intensity. Preserving the scotopic vision of the eye is important for the safety of a person when moving around in low level illuminated environment, which is why the large ring area for the warm light is highly advantageous over point sources or narrow ring-shaped sources according to the known art. Thus, although, a low intensity for night illumination as such could be accomplished by a small source, the large area of the ring has multiple advantages, as outlined above, including comfort and safety.

Especially useful are embodiments in which the ring-shaped part is concentric with the disc shaped part and overlaps with it. For example, the ring shapes part is within the area of the disc shaped part so that the area of the ring can be used at daytime as part of the disc and at night-time only as a ring-shaped illumination. Intermediate phases may be used for smooth transition. Optionally, the ring-shaped part is provided as the outermost part of the disc. For equal total illumination, the intensity of the ring-shaped part per area of the ring-shaped part is smaller than it would be for a minor central part of the disc.

Thus, the ring-shaped part is optimum with respect to low glare-effect at night, yielding high comfort for the user, and the disc shaped part is optimum for high intensity illumination, resembling daylight, however, within a compact area.

In summary, this technical solution is simple, compact, and easy to manufacture at relatively low cost, has a clear intuitive signalling effect to the user, and high degree of comfort due to the low intensity per area of light source while at the same time emitting a high total amount of light.

Such embodiments are explained in more detail below.

For use, the lamp is mounted and arranged with the lighting area being visible from a region surrounding the lamp so that the disc-shaped part and the ring-shaped part are both visible and mutually distinguishable from the region. It gives the possibility for a person looking at the lamp to differentiate between expression of daytime by the disc-shaped part and night-time by the ring-shaped part. For example, the lamp comprises a housing with a mounting side for mounting to a ceiling or wall and an opposite side at which the lighting area is provided for radiating light into surroundings.

In a practical embodiment, the first light source is configured for producing a first type of white light with a spectrum in which more than 30%, for example more than 40%, of the spectral energy content as measured by accumulated power relates to wavelengths in the range between 380 and 520 nm. Optionally, the second light source is configured for producing a second type of white light with a spectrum in which less than 5% of the spectral energy content as measured by accumulated power relates to wavelengths shorter than 520 nm. For example, the second type of white light is provided with a spectrum in which less than 4% or less than 3% or less than 2% or less than 1% of the spectral energy content measured by accumulated power relates to wavelengths shorter than 520 nm.

For example, in order to resemble daylight, the first white light has a first colour temperature in the range of 4700-8000 K.

Optionally, the second white light has a colour temperature in the range of 1700-2500 K.

The disc-shaped part has an outer diameter D1, and the ring-shaped part has an outer diameter D3. For example, D1 and D3 are in the range of 0.2 and 3 m, optionally larger than 0.3 m. In order for the disc and ring to be easily distinguishable from each other, even from a distance, it is advantageous if the inner diameter D2 of the ring-shaped part is not too small. For example, D2 is at least 0.1 m, optionally at least 0.2 m. For example, the disc-shaped part and the ring-shaped part are concentric. Optionally, the outer diameter D3 of the ring-shaped part is approximately equal to the outer diameter D1 of the disc-shaped part, so that disc-shaped part and the ring-shaped part are overlapping and within the same circular area, which is a compact technical solution, as the illuminated area of the lamp is used for different light spectra as compared to using different areas of the lamp for different types of light. As a further option, D2 is larger than half of D1.

Using the ring as a visual signal for night-time relatively to the disc as a signal for daytime has some advantage, as compared to other forms that are different from a disc. The ring has a dark central part and is therefore in appearance easily recognised as being different from a disc. For example, a half-disc is more similar to a full disc than a ring is to a full disc. Another advantage is that the ring, especially if it has an outer diameter D3 which is at least as large as the outer diameter D1 of the disc, offers a relatively large area from which light is emitted. This implies, in turn, that the predetermined level of illumination in the surroundings, for example in units of lux, can be achieved with a relatively low light intensity per area unit of the ring, which is in contrast to a point source for example, which has a high intensity in a small area. Accordingly, the light source has a high degree of comfort for the user.

Typical light intensities in terms of lux in the surroundings are in the range of 150-250 lux, for example 200 lux, for daytime illumination and in the range of 30-100 lux, for example 50 lux, for night-time illumination.

In relation to embodiments of the invention, the following should be pointed out in connection with the advantages of the lighting system. Although, the introduction of circadian lighting systems in hospitals has brought improvements for patients and personnel, there are on-going efforts for optimization. One group of patients that is addressed herewith are people with reduced cognitive ability, for example people having dementia, ageing people, psychiatric patients with seasonal or non-seasonal depression or other psychological disturbances, mentally disabled people or patients recovering after head trauma or stroke. In opposition to workforce enhancements, where the focus is mainly on creating light with high visibility and reduced nocturnal non-visual impact such as melatonin suppression, these groups of people benefit from the circadian lighting in several ways: First of all, they are not supposed to be awake at night, so any night activity should be made without any light that will either suppress melatonin or create acute alertness such that they can sleep optimally. Secondly, they are typically less mobile than healthy people, so during the daytime they have an extraordinary need for enough blue-rich light to manage a well synchronized daytime alertness as well as the circadian part of the sleep pressure that will lead the patients to proper sleep at the right time in the evening. Last but not least, daylight in general constitutes both a non-visual response and a psychological communication about the time of day. The dynamics in colour temperature, intensity and shadows communicate about the time of day at an unconscious level very robustly. To mentally challenged people, such robust communication constitutes an important information about the time of day and that information is typically not present in conventional lighting systems.

As an option, in order to resemble the impression of a sun, which is also readily recognized by people with reduced cognitive ability, the first type of white light is provided by an approximately constant intensity profile across the disc-shaped part.

Optionally, the lamp comprises a further light source configured for producing a further type of white light from the disc-shaped part of the lighting area. This further light source is used for intermediate illumination between the first and second type of white light and has a content of blue light which is intermediary between the first and second type of white light. For example, the energy of wavelengths in the range between 380 and 520 nm in the spectrum of the further type of white light is in the range of 10% to 20% as measured by accumulated power. Optionally, the further white light has a colour temperature, in the range of 2200-3500 K. Optionally, in order for differentiating it from the second type of white light, the second colour temperature and the further colour temperature differ mutually by more than 300 K, for example by more than 500 K.

In comparison, it is pointed out that incandescent lamps have a colour temperature in the range of 2200-2700 K, and candlelight has a typical temperature of approximately 1800 K. Moonlight has a colour temperature around 4100 K.

In practical embodiments, the first light source comprises a plurality of a first type of identical lighting elements distributed across the disc-shaped part and configured for emitting the first type of white light by an approximately constant intensity profile across the disc-shaped part. For example, there are provided at least 50 lighting elements, optionally at least 80 lighting elements, of the first type. Advantageously, these lighting elements are evenly distribution across the disc-shaped part.

Optionally, the second light source comprises a plurality of a second type of identical lighting elements. For example, the identical lighting elements of the second type are distributed only in the ring-shaped part and configured for emitting the second type of white light only from the ring-shaped part.

Optionally, the lighting area is provided by a light-diffusive translucent screen for blurring the light and preventing lighting elements from being individually distinguishable.

In some embodiment, the lighting area comprises a plurality of a further type of identical lighting elements distributed across the disc-shaped part and configured for emitting the further type of white light. For example, the method comprises providing the first type of white light across the disc-shaped part by illuminating the first type of lighting element, gradually reducing the light intensity of the first type of lighting element and simultaneously increasing the light intensity of the further type of lighting elements and causing a gradual reduction of colour temperature from the first type of white light to the further type of white light in the disc-shaped part, for example while maintaining an approximately constant intensity profile across the disc-shaped part. Subsequently the intensity in the disc-shaped part is gradually reduced and the light intensity of the second type of white light in the ring-shaped part increased, causing a gradual transition from the further type of white light in the disc-shaped parts to the second type of white light for illumination only in the ring-shaped part. The gradual transition is made continuously or in steps, for example small steps. Such gradual shift is very pleasant for the user, while the lighting system implies a high degree of comfort with minimal stress on the eye and with a slow adaptation for the eye to the shifted illumination condition.

Alternatively, the lighting area comprises a plurality of a second type of identical lighting elements distributed across the disc-shaped part as well as the ring-shaped part, configured for emitting the second type of white light selectively in the disc-shaped part and the ring shaped part. Optionally, the selective illumination is done by a programmable controller. For example, the method comprises providing the first type of white light across the disc-shaped part from the first type of lighting element, gradually reducing the light intensity from the first type of lighting element and simultaneously increasing the light intensity from the second type of lighting elements across the disc shaped part and causing a gradual, for example continuous, reduction of colour temperature towards the second type of white light in the disc-shaped part. Subsequently the intensity of the second type of white light is gradually reduced in a central region of the disc-shaped part and gradual transition is provided until the second type of white light is only provided only in the ring-shaped part.

Optionally, and especially in the case of at least three types of lighting elements, of which two are in the disc-shaped part, the second type of lighting elements is only in the ring-shaped part.

For example, after a predetermined lapse of time, typically in the range of hours, for example 2-8 hours, the process from the first to the second type of white light can be reversed for achieving a gradual transition from the second type of white light only in the ring-shaped part towards the first type of white light in the disc-shaped part.

The change in colour temperature as well as shape of the illuminated part of the lighting area resembles an intuitively easy-understandable clock that is detectable for people with mental disabilities or with low motivation or ability to engage with the surroundings.

For example, the lighting system also comprises further lamps of identical types, the lamp as described above and the further lamps form a group of lamps. Optionally, a common controller is connected to the group and programmed for synchronous shifting of the group simultaneously between emission of the first type of white light from the disc-shaped part of the lighting area and emission of the second type of white light from the ring-shaped part. Thus, all lamps in one group shift the same way at the same time.

In a facility, for example hospital or elderly home, as well as a rehabilitation centre, several groups of lamps can be provided, wherein one group is controlled differently than another group. Typically, the lighting in the corridor is different from the lighting in the rooms.

The switch or gradual transition between different lighting states of the lamp is controlled by a controller, which is electrically or wirelessly connected to the lamp or group of lamps. The controller is programmable, for example from a wireless control panel. An example is a tablet computer or a smartphone with a corresponding application, also called app, having a suitable user interface in order for the user to program the controller.

In some embodiments, the shifts between the white light in the various time ranges is adjusted to a 12-hour length of the daytime. As a further option, the length of this daytime relatively to the length of the nighttime is adjusted in accordance with the time of year. For example, in the northern hemisphere, the day in December is much shorter than the day in June.

For example, the gradual or abrupt changes of light are performed within time ranges of 2-8 hours. If it shall resemble a cycle of 24 hours, the disc-shaped part can have the highest colour temperature at noon, with a reduction of the temperature towards warmer light at evening time. Then, the second type of white light from the ring-shaped part is used only during nighttime. However, such artificial day rhythm can be shorted or prolonged, depending on the needs, for example depending on the therapeutic purpose or according to comfort criteria or according to worker schedules. For example, workers on ships, offshore installations, power plants, or military installations, may be exposed to a different day rhythm in order to optimize the working efficacy.

Useful lighting elements are light emitting diodes, LED.

In practical embodiments, the lamp comprises a housing with a mounting side, for mounting to a ceiling or wall, and an opposite side where the lighting area is provided for radiating light into the surroundings from this lighting area. If the lamp is fixed to a ceiling, and the illuminated region in the surrounding is under the lamp. However, the lamp can also be fixed to a wall and radiate laterally or inclined out from the wall. As a further alternative, the lamp can hang down from a ceiling, for example by wires, or be provided as a standing lamp. The lighting area is visible from the region in the surrounding such that a change of the lighting area from the disc to the ring is visible and the shift of shapes from the disc to the ring easily recognized. This implies that the light is emitted into the same region from the same side of the lamp, which is in contrast to lamps that change the direction of the light when shifting the spectrum from cold to warm light, for example shifting from downwards to upwards illumination. Optionally, the housing is circular and approximately of the same size as the circular lighting area.

In the described embodiments, different broadband lighting elements, for example LED, have been used to switch between the various states. However, it is noted that also multi-coloured lighting elements, for example LEDs, can be used to obtain the same effect. In this case, the first type of white lighting element, such as LED, is substituted with several groups of lighting elements, such as LED, which in common substitute the first type and which in common emit white light. Correspondingly for the second and further type of lighting elements described herein.

Whether multi-coloured lighting elements or broadband lighting elements are used, important is that the lighting system is operated to automatically and periodically changing between a light disc resembling daylight with a high content of blue light and a night light illumination in the ring-shaped part with low content of blue light in order not to disturb melatonin production.

BRIEF DESCRIPTION

Some of the embodiments will be described in detail, with references to the following Figures, wherein like designations denote like members, wherein.

DETAILED DESCRIPTION

Figure 1:
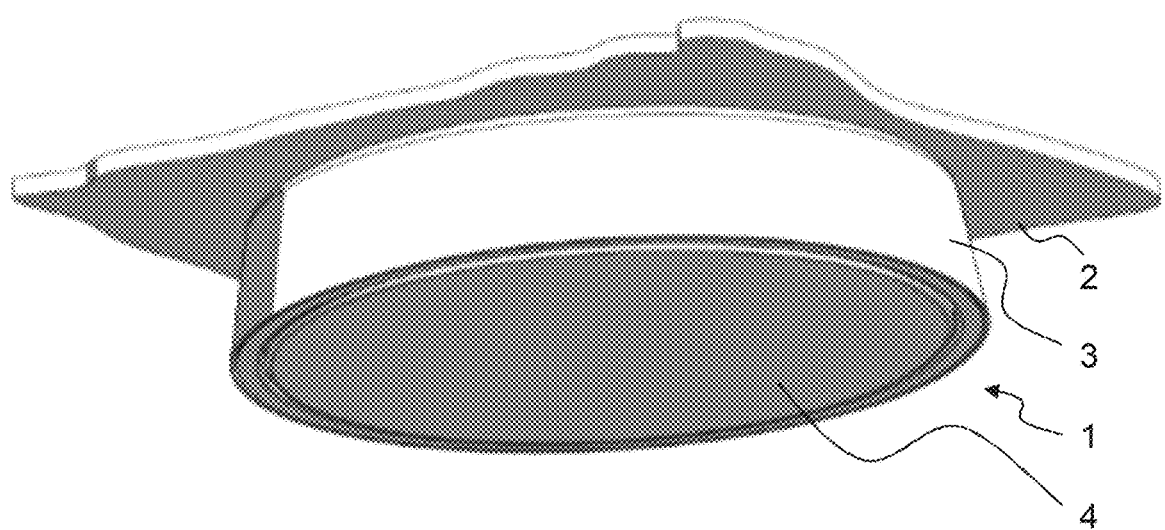
FIG. 1 illustrates am example of a lamp fixed on a ceiling.

FIG. 1 illustrates a lamp 1 fastened to a ceiling 2. The lamp 1 comprises a circular housing 3 inside which a plurality of lighting elements, optionally light emitting diodes, LEDs, are provided. The housing 3 is closed by a translucent or transparent circular screen 4, typically a diffusive screen which blurs and scatters the light such that the emission is more evenly distributed, and the single lighting elements inside the lamp 1 are not discernible.

A typical diameter of the lamp is between 0.2 and 3 m, for example in the range of 0.3 to 3 m or 0.3 to 1 m. Often multiple of such lamps 1 are mounted in a room. Especially, in elderly homes and hospitals, as well as rehabilitation centres, the lighting system as disclosed has been found useful. However, the lighting system is universal and is generally applicable also in other types of rooms, for example private homes and public areas.

Figure 2:
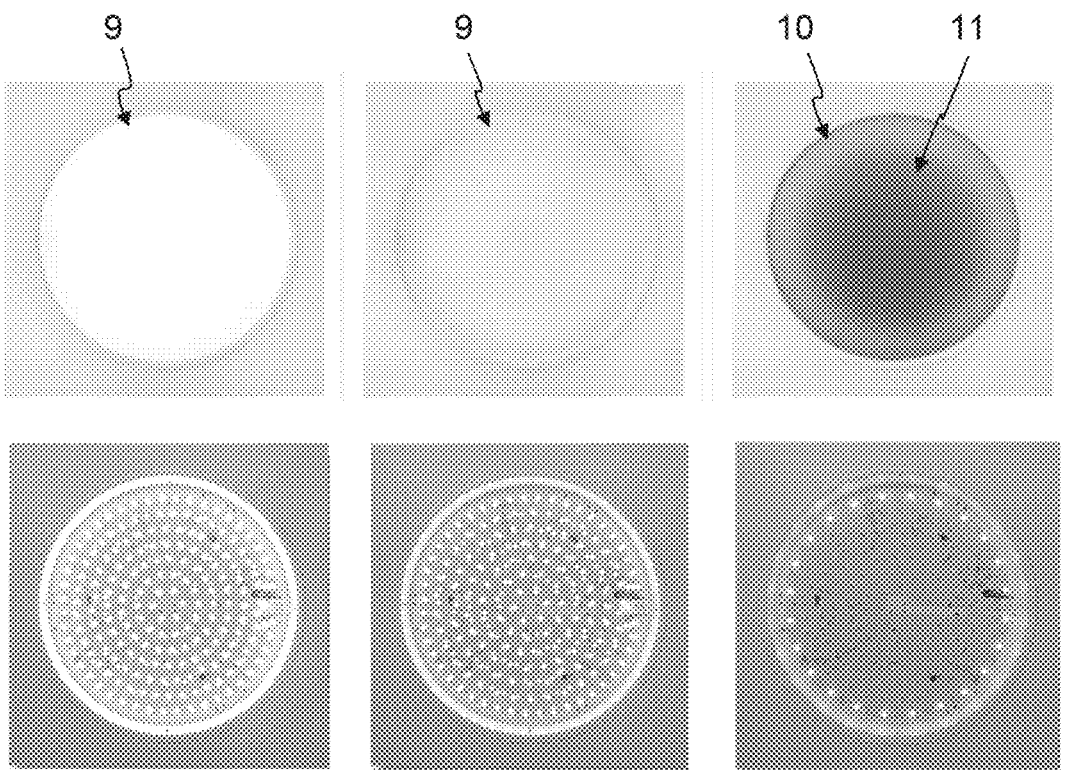
FIG. 2 illustrates three emission states, the top row with the diffusive screen the bottom row without the diffusive screen.

FIG. 2 illustrates three lighting states of the lamp 1. The upper row shows the lamp 1 with diffusive screen 4, and the lower row without the diffusive screen 4 so that the LEDs are visible for illustration. In the left images, the light of the disc-shaped part is of a first type of white with a large content of blue light in order to resemble a shining sun in daytime. The middle image shows the disc-shaped part with a further type white light that has a warmer appearance with reduced blue light level in order to resemble the dawning or rising sun. The right image shows a ring-shaped part in a second type of white light with a small content of blue light or approximately without blue light.

Although, these three states can be provided in steps, it is preferred that the shift from one to the next state is gradual, for example continuous, which is made possible by changing the relative intensities between the different groups of LEDs.

The images show a disc-shaped part 9 and a ring-shaped part 10, where the ring-shaped part 10 overlaps with the disc-shaped part 9. When the second type of white light is provided in the ring-shaped part 10, the central region of the lamp 1 is not illuminated.

Figure 3A:
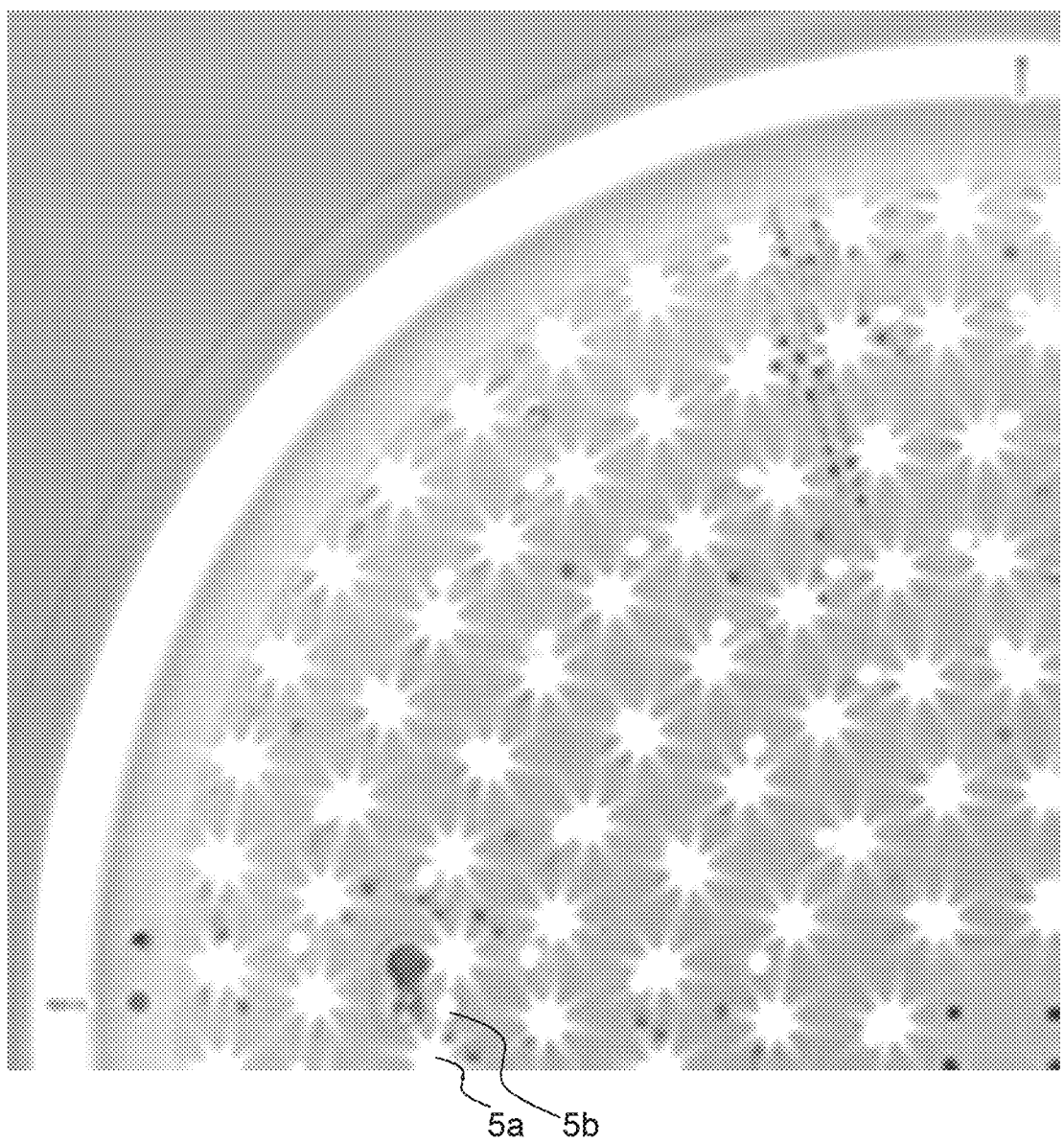
FIG. 3A illustrates a first emission states of FIG. 2 in a quarter of the lamp, where A shows the disc-shaped part with a high content of blue light.
Figure 3B:
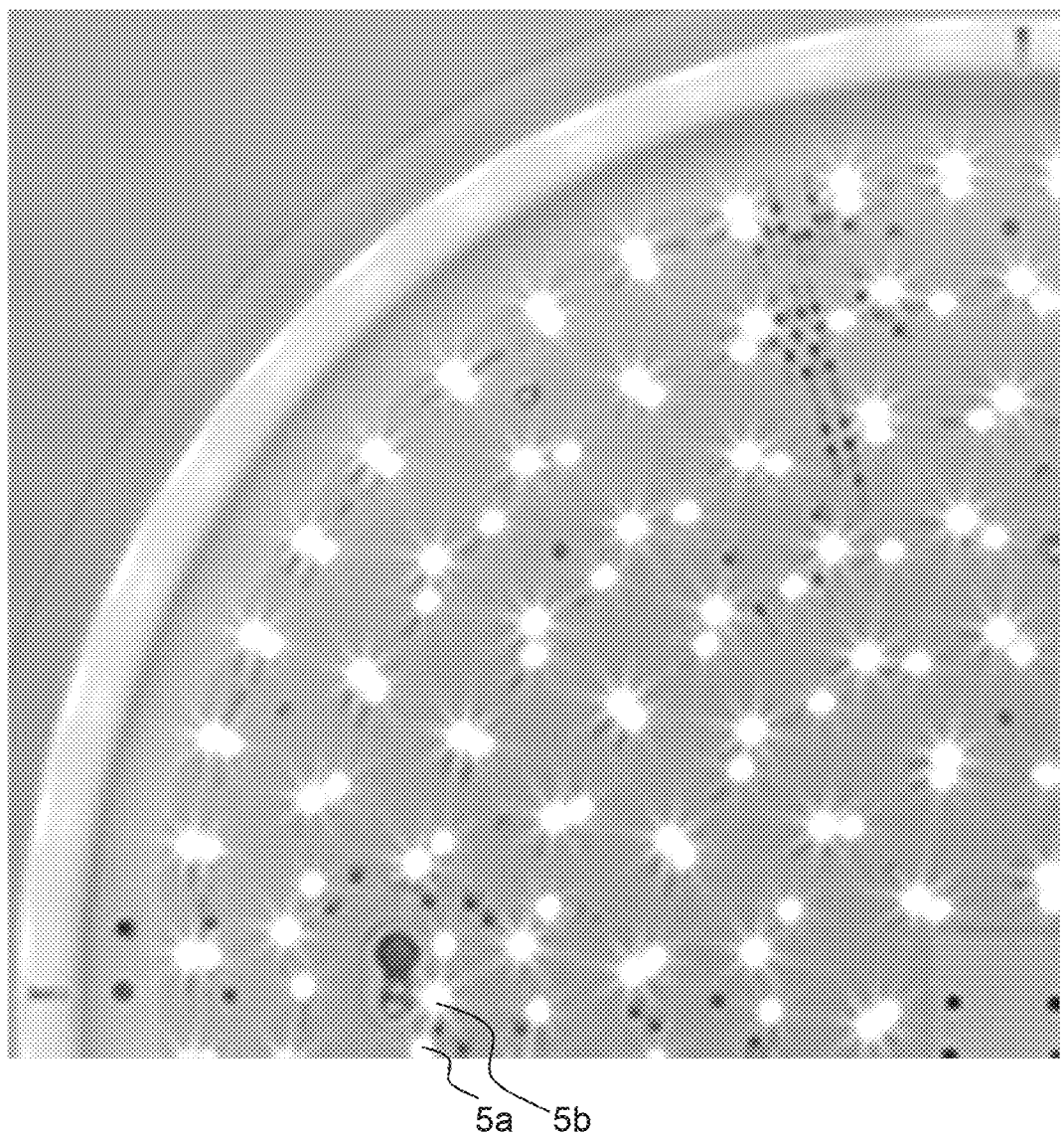
FIG. 3B illustrates a second emission states of FIG. 2 in a quarter of the lamp, where.
Figure 3C:
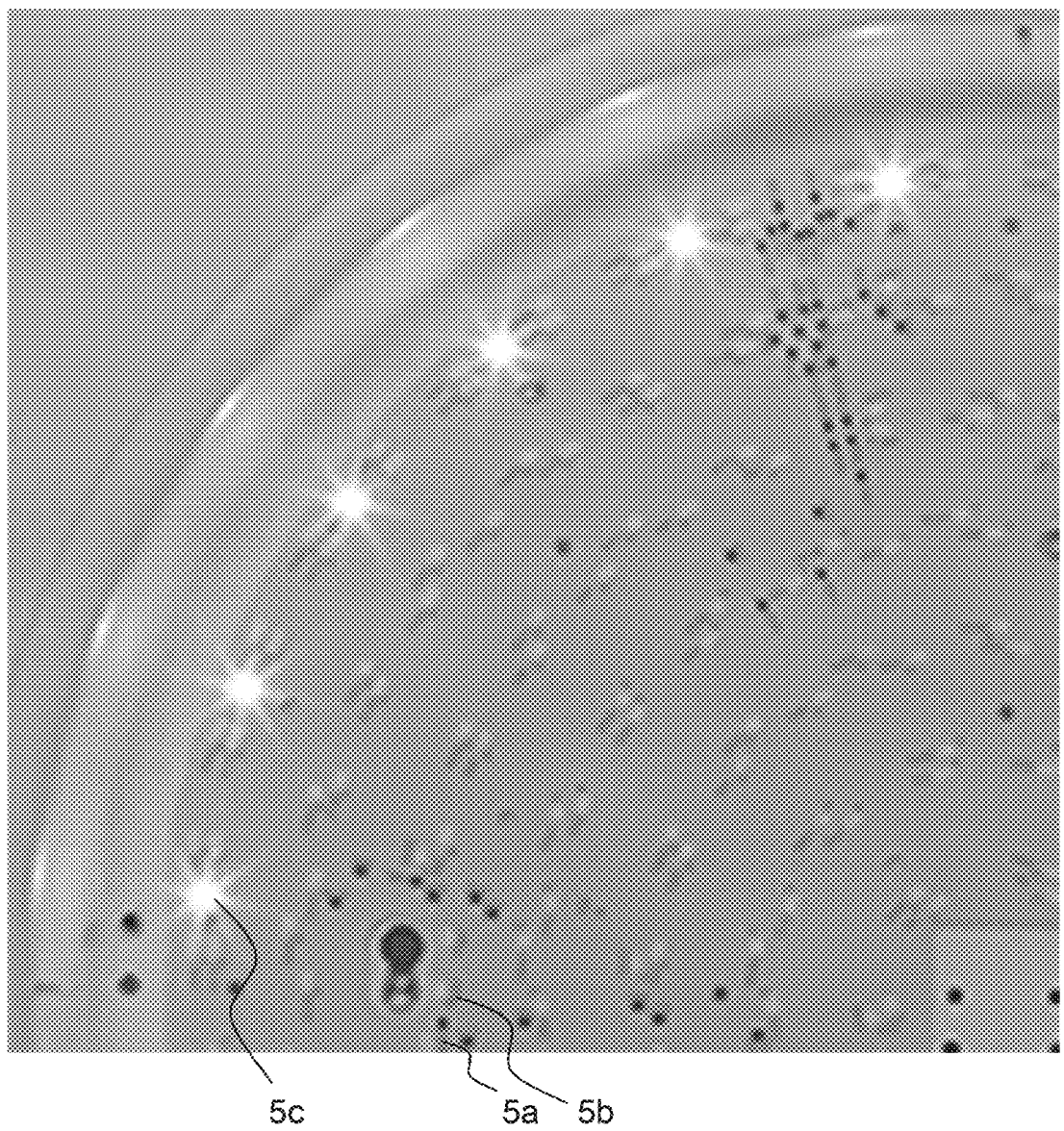
FIG. 3C illustrates a third emission states of FIG. 2 in a quarter of the lamp.
Figure 5A:
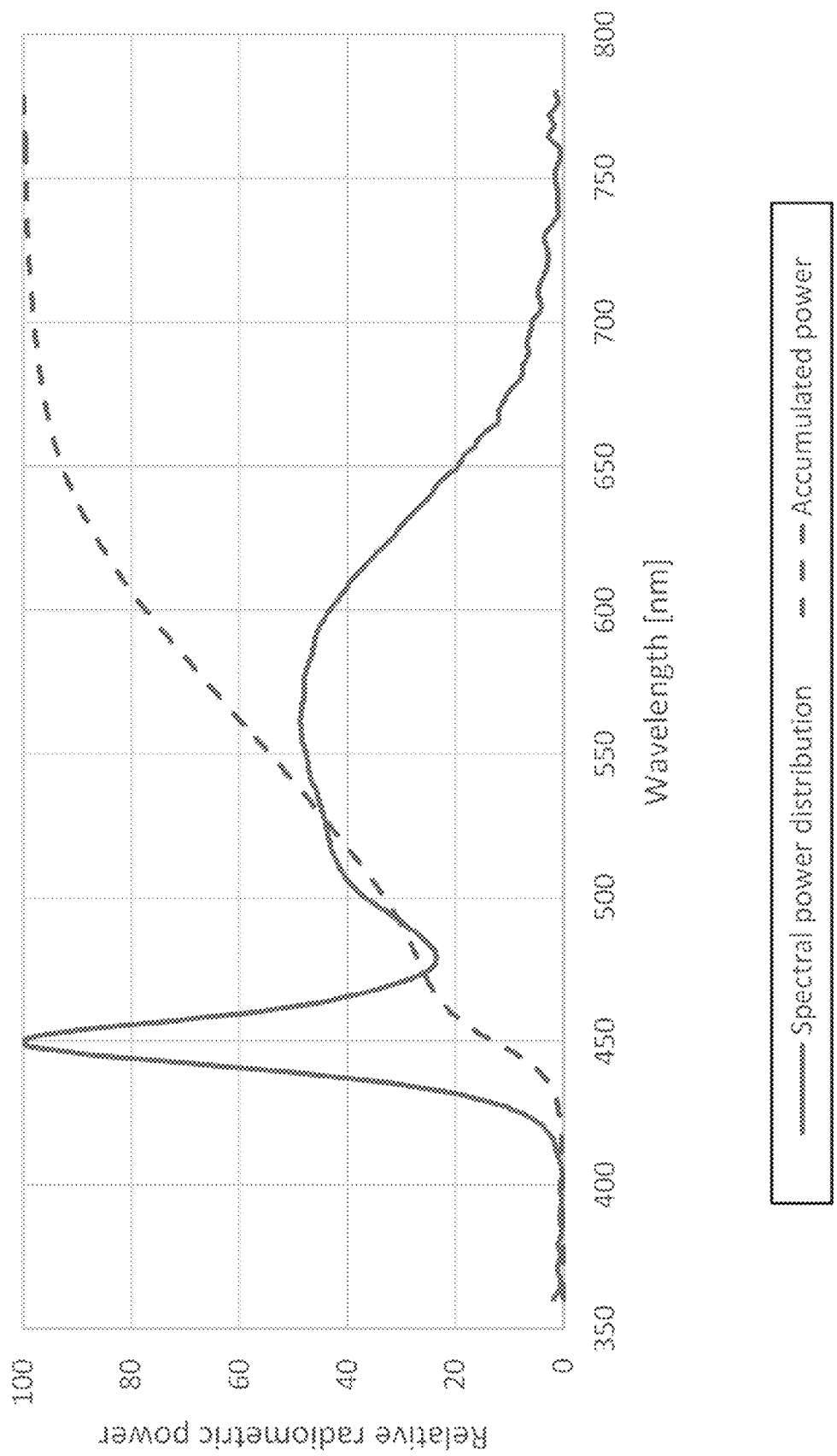
FIG. 5a shows an example of spectral distributions as well as accumulated power of the lighting elements, where a) is for the first type of lighting elements.
Figure 5B:
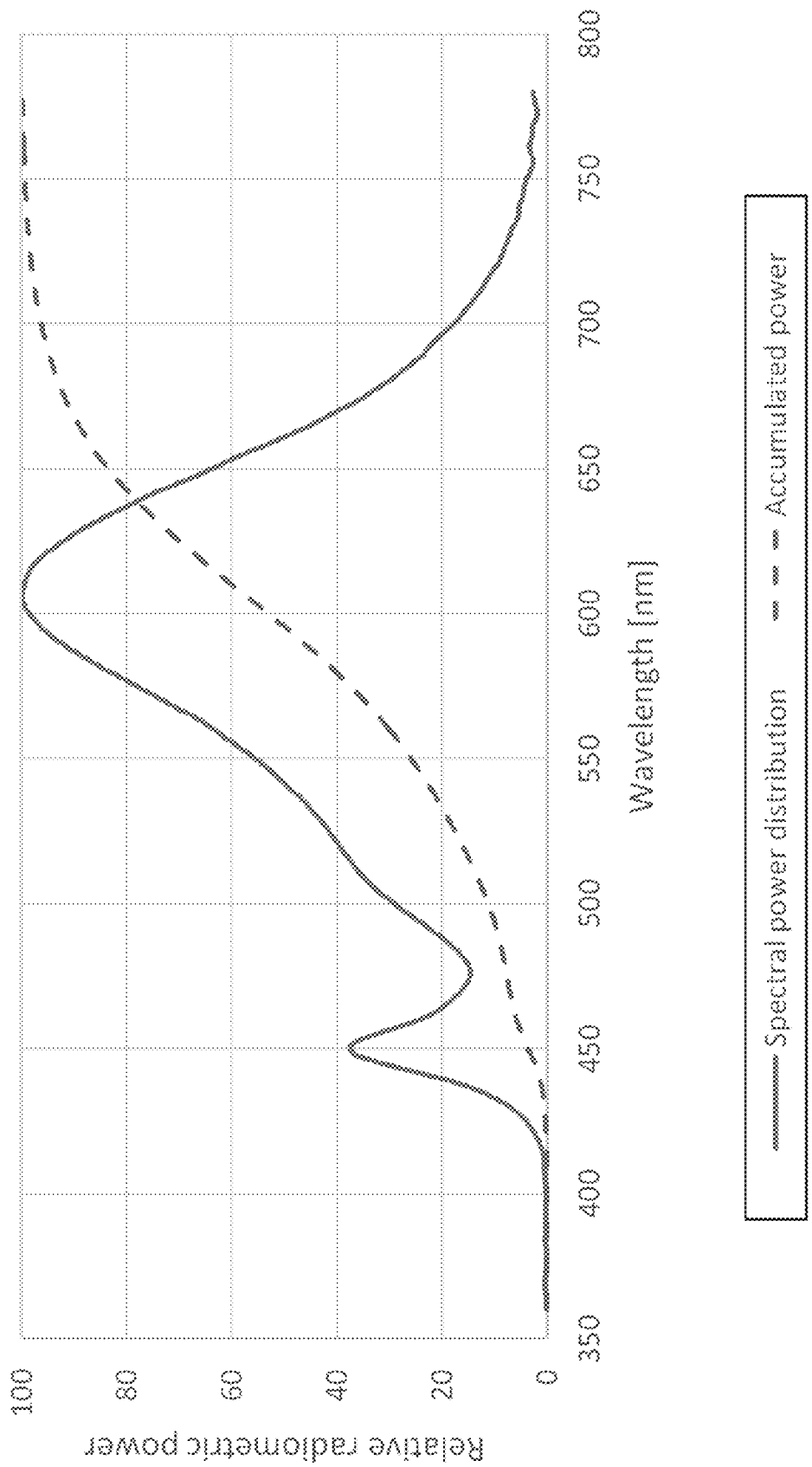
FIG. 5b shows an example of spectral distributions as well as accumulated power of the lighting elements for the second type of lighting elements.

An example of LED shift for the three states is illustrated in FIGS. 3A, 3B, and 3C, which show an enlarged quarter of the lamp 1 for each of the three states of FIG. 2. Distributed across the lamp 1 to provide a disc of light is a first type 5a of LEDs which emit a first type of white with a high content of blue light, largely resembling daylight. An example of such a spectrum is illustrated in FIG. 5a. The photo shows a shining star-pattern appearance of each strongly illuminated LED of the first type 5a in FIG. 3A, whereas the LEDs of a further type 5b have a low intensity, which is why they do not appear with a star-pattern. When comparing FIG. 3B with FIG. 3A, it is readily recognised that the star-pattern appearance, which resembles high intensity, has shifted from the LEDs of the first type 5a to the LEDs of the further type 5b. The LEDs of the further type 5b have a lower content of blue light than the first type 5a and, accordingly, a warmer appearance. An example of such a spectrum is illustrated in FIG. 5b. For example, as measured by accumulated power, the spectral energy content of light in the wavelength region of 380-520 nm, including blue light, is more than 30%, optionally more than 40%, in the first type of LED and in the range of 10-20% in the further type of LED.

In FIG. 3c, the LEDs of the first type 5a and further type 5b have been switched off, while an outer ring of LEDs of a second type 5c is illuminated. The LEDs of the second type 5c have a second type of white light with a yellowish warm colour with little or no blue colour content.

Figure 5C:
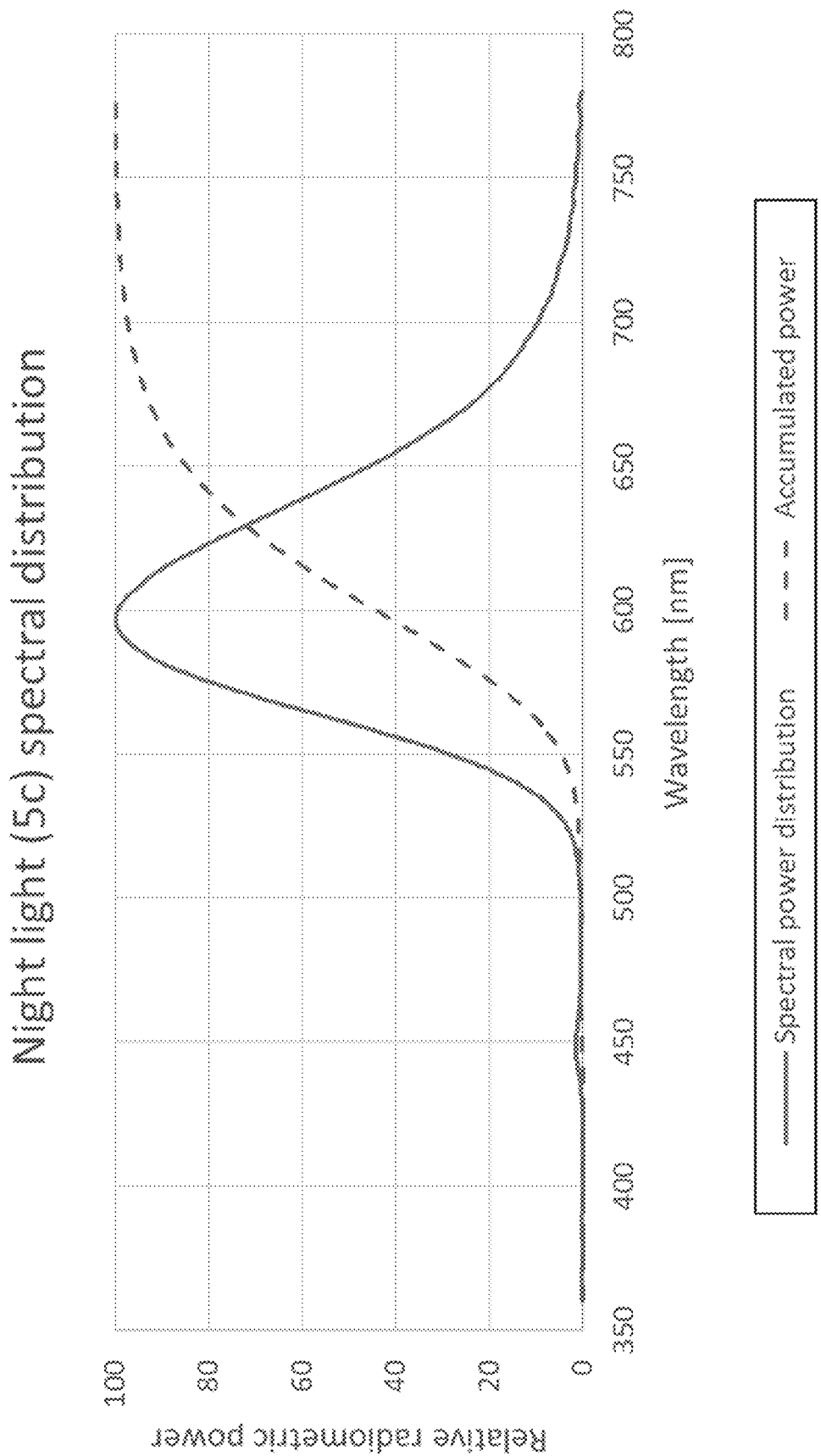
FIG. 5c shows an example of spectral distributions as well as accumulated power of the lighting elements for the third type of lighting elements.

For example, for the second type 5c of LED, less than 5%, or less than 2%, or even less than 1%, of the spectral energy content, as measured by accumulated power, is related to light with a wavelength below 520 nm. An example of such a spectrum is illustrated in FIG. 5c. The ring-shaped part of the lighting area with the second type 5c of LED is clearly different from the disc-shape part of the lighting area with the first type 5a and the further type 5b of LED. The corresponding spectra are shown in FIGS. 5a and 5b.

It is pointed out that the second type 5c of LED is exemplified as not being provided outside the ring-shaped part 10, especially not in the central region 11 of the lamp. However, in case that the lamp 1 is provided with only two types of lighting elements, the second type of lighting elements are advantageously also provided all across the disc-shaped part 9 in order to vary the temperature of the disc-shaped part. In such case, the central part 11 is switched off for emitting the second type light only from the ring-shaped part 10.

The further type of LED is the shown embodiment is only a single type but could comprise several further types of LED.

For example, the LEDs are selected such that the LEDs of the first type 5a have a first type of white light with a colour temperature in the range of 4700-8000K, the LEDs of the further type of LED have a further colour temperature in the range of 2200-3500K, and the second type of LED have a colour temperature in the range of 1700-2500K, however, the second type having a lower colour temperature than the further type.

In order to have a distinct transition of light temperature with the first, second and further type of lighting elements, it is advantageous if the colour temperature of the second type of lighting elements differs by at least 300K, for example differs by at least 500 K, from the colour temperature of the further type of lighting elements.

Offset for the temperatures is daylight which has a temperature in the range of 5000-8000K for sunlight at noon for direct sunlight or partly overcast, in the range 4000-5000 in the afternoon, in the range of 2500-4000 close to and at sunset or sunrise. At night, the temperature of the light is lower, for example like the very last of a sunset or when using candlelight, the latter having a typical temperature around 1800K. The important elements of the light used at night is absence or low level of low-wavelength radiation in the range of 380-520 nm to avoid any adverse non-visual response in the human body, especially with respect to melatonin suppression. However, the light at night is broad-band and with a continuous spectrum within the visible spectrum, for example between 520 nm and 780 nm, in order to represent a naturally occurring light spectrum to the human eye.

For example, the intensity in terms of lux varies by a factor of 4-10, between the light in the ring-shaped part when the intensity is lowest and the bright disc-shaped part with light emission at maximum intensity.

By mixing the light from the LEDs of the first type 5a and the further type 5b and adjusting the intensity between the two types, the temperature of the light across the disc-shaped diffusive screen can be adjusted gradually between the highest temperature, which is the temperature of the first type of LEDs, and the lower temperature, which is the temperature of the LEDs of the further type. This resembles the temperature variation of the sunlight during the day. Two types of LEDs have been found sufficient, but it is also possible to use more than two types of LEDs distributed across the lamp in order to vary the colour temperature.

The LEDs of the second type 5c are only provided in a ring pattern as the second lighting area and do only provide a ring-shaped emission. However, it is also possible to distribute the LEDs of the further type 5c across the disc lamp and switch off the LEDs in the central region so that only the second type of white light in the ring structure remains. It is seen in FIG. 2 that the ring appears broader when the diffusive translucent screen is mounted that without, which is also intended.

Figure 4:
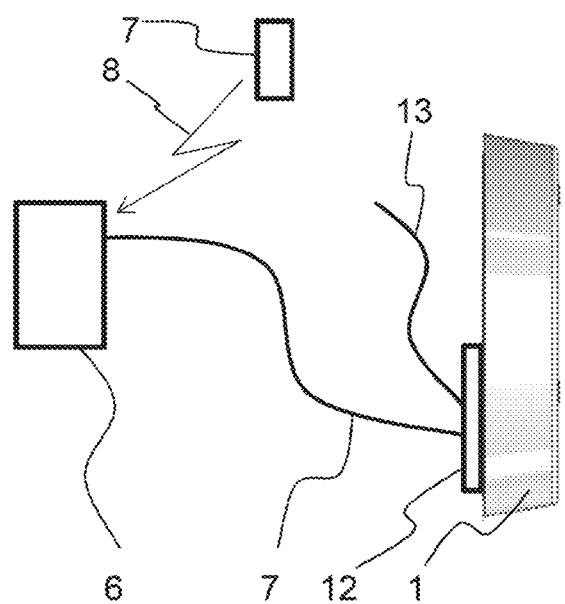
FIG. 4 illustrates a lighting system with a lamp and a controller.

As illustrated in FIG. 4, the transition between the states as illustrated above are achieved by employing a controller 6 which is connected by a wire 7, or alternatively wireless, to a driver 9 inside or on the lamp 1, or alternatively, outside the lamp 1. The driver 12 receives electrical power through a cable 13 and provides electricity selectively to the various LED groups inside the lamp 1, for example the two or three types of LED as explained above.

Alternatively, the controller 6 is also provided on or inside the lamp 1. Optionally, the controller 6 and driver 12 are provided as a combined unit inside the lamp 1.

As a further option, the driver 12 is provided remote to the lamp and is connected to the LED groups inside the lamp through a bundle of cables from the driver to the LEDs in the lamp. Such a driver 12 can be used to drive LED groups in a group of lamps 1 if connected to such plurality of lamps.

The controller 6 comprises a programmable computer unit, for example a Programmable Logic Circuit (PLC) board, which by digital or analogue data signals instructs the driver 12 for how to distribute the electricity to the various lighting elements in the lamp 1, for example follow sequences as explained above.

Programming of the controller 6 is optionally made by a wireless connection 8 between the controller 6 and an external computer 7. Popular and useful as such external computer are small tablet computers or smartphones in which a corresponding program is provided, also called "app" as a short term for computer application.

In case that a plurality of lamps is provided, it is possible to use a single controller 6 with a wired or wireless connection 7 to the plurality of lamps 1, each lamp comprising a driver 12. Alternatively, individual controllers 6 are provided for or in each lamp 1 or for each of a plurality of groups of lamps. Advantageously, the controller 6 or controllers can be programmed, for example wirelessly, to cause the same light behaviour of all lamps 1 by instructing the connected driver or drivers accordingly. If all the lamps 1 are provided in a single room, for example corridor, this is advantageous. For different rooms, for example a patient room as compared to a corridor, however, the light control is potentially different for the lamps in the patient rooms and the corridor. In some embodiments, various controllers 6 are used whereas in other embodiments, a common controller 6 is programmed to instruct the drivers of one group of lamps with one lighting profile and another group with another lighting profile.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for operating a lighting system with a geometrical time signalling effect; the method comprises:
providing a lamp with a lighting area and arranging the lamp so that the lighting area is visible from a region in surroundings of the lamp; wherein the lighting area comprises a first light source producing a first type of white light with a first spectrum, wherein more than 30% of a spectral energy content of the first spectrum measured by accumulated power relates to wavelengths in a range between 380 and 520 nm and a second light source producing a second type of white light with a second spectrum, wherein less than 5% of a spectral energy content of the second spectrum measured by accumulated power relates to wavelengths shorter than 520 nm; and
periodically shifting between emission of the first type of white light and emission of the second type of light;
wherein the first type of white light is emitted from a disc-shaped part of the lighting area and the second type of white light is emitted from a ring-shaped part of the lighting area; wherein the disc-shaped part and the ring-shaped part are both visible and mutually visually distinguishable from the region and the first type of white light and the second type of white light emitted from the disc-shaped part and the ring-shaped part, respectively, are directed into the region from a same side of the lamp, where the disc-shaped part signals day-time and the ring-shaped part signals night-time to a person in the region,
wherein the method further comprises producing the first type of white light and the second type of white light emitted from the disc-shaped part and the ring-shaped part concentrically; wherein the disc-shaped part has an outer diameter D1, and the ring-shaped part has an inner diameter D2 and an outer diameter D3, wherein the outer diameter D1 and the outer diameter D3 are in a range of between 0.2 and 3 m, wherein the inner diameter D2 is at least 0.1 m, and wherein the outer diameter D1 is approximately equal to the outer diameter D3, and the inner diameter D2 is larger than half of the outer diameter D1.

2. The method according to claim 1, wherein the spectral energy of the second spectrum measured by accumulated power of said wavelengths shorter than 520 nm in the second spectrum of the second type of white light is less than 2%.

3. The method according to claim 1, wherein periodically shifting from the first type of white light to the second type of white light is performed via an intermediate, further type of white light produced by a further light source in the disc-shaped part of the lighting area; wherein an energy of wavelengths in the range between 380 and 520 nm in a spectrum of the further type of white light is in a range of 10% to 20%.

4. The method according to claim 3, wherein the first white light has a first colour temperature in a range of 4700-8000 K, the further type of white light has a further colour temperature, in a range of 2200-3500 K, and the second type of white light has a second colour temperature in a range of 1700-2500 K; wherein the second colour temperature and the further colour temperature differ by more than 300 K.

5. The method according to claim 1, wherein the lighting area comprises a plurality of a first type of identical lighting elements distributed across the disc-shaped part and configured for emitting the first type of white light; and wherein the method comprises providing the first type of white light by an approximately uniform intensity profile across the disc-shaped part.

6. The method according to claim 5, wherein the lighting area comprises a plurality of second type of identical lighting elements distributed only in the ring-shaped part and configured for emitting the second type of white light; wherein the lighting area comprises a plurality of a further type of identical lighting elements distributed across the disc-shaped part and configured for emitting the further type of white light; wherein the method comprises providing the first type of white light across the disc-shaped part by illuminating the first type of lighting elements, gradually reducing a light intensity of the first type of lighting elements and simultaneously increasing a light intensity of the further type of lighting elements and causing a gradual reduction of colour temperature from the first type of white light to the further type of white light in the disc-shaped part, while maintaining an approximately uniform intensity profile across the disc-shaped part; subsequently gradually reducing the intensity in the disc-shaped part and increasing a light intensity of the second type of white light in the ring-shaped part and causing a gradual transition from the further type of white light in the disc-shaped parts to the second type of white light for illumination only in the ring-shaped part.

7. A lighting system comprising:
a lamp with a geometrical time signalling effect;
the lamp comprising a lighting area with a first and a second light source in the lighting area; wherein the first light source is configured for producing a first type of white light with a first spectrum, wherein more than 30% of a spectral energy content of the first spectrum measured by accumulated power relates to wavelengths in the range between 380 and 520 nm;
wherein the lighting system is configured for periodically shifting between emission of the first type of white light by the first light source and emission of a second type of light by the second light source wherein the second light source is configured for producing a second type of white light with a second spectrum, wherein less than 5% of a spectral energy content of the second spectrum measured by accumulated power relates to wavelengths shorter than 520 nm; and
wherein the first light source forms a disc-shaped part of the lighting area and the second light source forms a ring-shaped part of the lighting area, where the disc-shaped part is configured to signal day-time and the ring-shaped part is configured to signal night-time to a person when both the disc-shaped part and the ring-shaped part are visible and visually distinguishable by the person and the light emitted from both the disc-shaped part and the ring-shaped part is directed into the region from a same side of the lamp, wherein the disc-shaped part and the ring-shaped part are concentric; wherein the disc-shaped part has an outer diameter D1, and the ring-shaped part has an inner diameter D2 and an outer diameter D3, wherein D1 and D3 are in the range of 0.2 and 3 m, and wherein D2 is at least 0.1 m, and wherein D1 is approximately equal to D3, and D2 larger than half of D1.

8. The lighting system according to claim 7, wherein the first light source comprises a plurality of a first type of identical lighting elements distributed across the disc-shaped part and configured for emitting the first type of white light by an approximately uniform intensity profile across the disc-shaped part; wherein the second light source comprises a plurality of second type of identical lighting elements distributed only in the ring-shaped part and the lamp is configured for emitting the second type of white light only from the ring-shaped part.

9. The lighting system according to claim 7, wherein the lamp comprises a further light source configured for producing a further type of white light from the disc-shaped part of the lighting area; wherein the energy of wavelengths in the range between 380 and 520 nm in the spectrum of the further type of white light is in a range of 10% to 20% of total spectral energy.

10. The lighting system according to claim 9, wherein the first type of white light has a first colour temperature in a range of 4700-8000 K, the further type of white light has a further colour temperature, in a range of 2200-3500 K, and the second type of white light has a second colour temperature in a range of 1700-2500 K; wherein the second colour temperature and the further colour temperature differ mutually by more than 300 K.

11. The lighting system according to claim 7, wherein the lamp comprises a housing with a mounting side for mounting to a ceiling or wall and an opposite side at which the lighting area is provided for radiating light into surroundings.

12. The lighting system according to claim 11, wherein the lighting area is provided by a light-diffusive translucent screen for blurring light and preventing lighting elements from being individually distinguishable.

13. Use of the method according to claim 1 and the lighting system according to claim 7 for signalling different day-time periods to said person who has reduced cognitive ability.

14. The lighting system according to claim 7, wherein the second type of white light is a yellowish warm colour in which blue colour content is present at reduced levels.

15. The method according to claim 1, wherein the second type of white light is a yellowish warm colour in which blue colour content is present at reduced levels.

* * * * *